United States Patent [19]
Anderson et al.

[11] Patent Number: 5,845,948
[45] Date of Patent: *Dec. 8, 1998

[54] D-SECTION BUMPER

[75] Inventors: Jeffrey A. Anderson, Clarksville; Robert B. Senior, Holland; Gregory J. Filipek, Ionia, all of Mich.

[73] Assignee: American Bumper & Mfg. Co., Ionia, Mich.

[ * ] Notice: The term of this patent shall not extend beyond the expiration date of Pat. No. 5,725,266.

[21] Appl. No.: 902,456

[22] Filed: Jul. 29, 1997

Related U.S. Application Data

[63] Continuation of Ser. No. 669,234, Jun. 24, 1996.

[51] Int. Cl.$^6$ .................................................. B60R 19/02
[52] U.S. Cl. .............................................................. 293/120
[58] Field of Search ........................... 293/102, 120–122, 293/107; D12/167, 169

[56] References Cited

U.S. PATENT DOCUMENTS

| | | | |
|---|---|---|---|
| 3,164,896 | 1/1965 | Fullman | 228/147 |
| 3,529,346 | 9/1970 | Grimoldi et al. | 29/475 |
| 3,705,458 | 12/1972 | Vassar | 228/147 |
| 3,920,173 | 11/1975 | Salata | 228/147 |
| 3,921,883 | 11/1975 | McLain | 228/17.5 |
| 3,986,654 | 10/1976 | Hart et al. | 228/155 |
| 4,073,528 | 2/1978 | Klie | 293/122 |
| 4,350,378 | 9/1982 | Wakamatsu | 293/120 |
| 4,796,798 | 1/1989 | Tsuta et al. | 228/146 |
| 5,080,410 | 1/1992 | Stewart et al. | 293/102 |
| 5,080,411 | 1/1992 | Stewart et al. | 293/122 |
| 5,080,427 | 1/1992 | Sturrus et al. | 296/188 |
| 5,092,512 | 3/1992 | Sturrus et al. | 228/146 |
| 5,104,026 | 4/1992 | Sturrus et al. | 228/17.5 |
| 5,306,058 | 4/1994 | Sturrus et al. | 293/154 |
| 5,395,036 | 3/1995 | Sturrus | 228/146 |
| 5,725,266 | 3/1998 | Anderson et al. | 293/120 |
| 5,961,603 | 10/1990 | Carpenter | 293/102 |

FOREIGN PATENT DOCUMENTS

| | | | |
|---|---|---|---|
| 680298 | 4/1980 | France | 293/120 |
| 2735141 | 2/1979 | Germany | 293/120 |

OTHER PUBLICATIONS

SAE Technical Paper Series 900737 by James E. Borchelt, Jack Shapiro and Bala Subbaraman, Feb. 26–Mar. 2, 1990.
SAE Technical Paper Series 900428 by James E. Borchelt & Bala Subbaraman, Feb. 26–Mar. 2, 1990.
Bumper Design, Materials, and Fabrication 730030 by R. R. Golze & R. F. Keenle, Jan. 8–Dec. 1973.

*Primary Examiner*—Dennis H. Pedder
*Attorney, Agent, or Firm*—Young & Basile, P.C.

[57] ABSTRACT

A bumper system for vehicles having a bumper beam formed from ultra high strength steel rolled formed into a tubular body having a generally D-shaped cross-section. The D-shaped cross-section has a top and bottom flat surface area and a parabolic center area therebetween.

9 Claims, 7 Drawing Sheets

D-SECTION BUMPER

This application is a continuation of Ser. No. 08/669,234 filed Jun. 24, 1996.

FIELD OF THE INVENTION

The invention is a roll-formed bumper beam having a D-section configuration.

BACKGROUND OF THE INVENTION

Automotive bumper systems are designed to meet a number of low speed bumper impact requirements set by the federal government as well as by internal corporate standards. Simultaneously, fuel economy concerns have required that bumpers now be constructed to have low weight and aerodynamic configurations. In addition, the automobile manufactures are always striving to meet consumer expectation and marketing competition to provide a low cost and safe vehicle. In this endeavor to meet sometimes conflicting requirements, many bumper systems are composed of a bumper made from a variety of high strength steels that is overlaid with a layer of energy absorbing and aerodynamical facia. The weight and expense of the bumper lies in the material and manufacture of the bumper beam. The material strength and the configuration of the bumper beam effects the amount of added filler foam required for the facia to meet impact standards.

In general, the basic functions of the bumper system include absorbing energy and protecting the car from damage in a collision. The secondary function include giving structure to the car by providing a cross-member. An aesthetic function includes providing styling by using increased curvature or sweeps. It is the desire of the automobile manufacturer to ensure this criteria to his customer.

SUMMARY OF THE INVENTION

The aforementioned criteria are met by a vehicle bumper system according to the present invention implementing a D-section bumper configuration. The bumper is constructed of an ultra-high strength steel, that is, steel with tensile strength in excess of 690 MPA or 100 KSI, and with a 45 sweep. The shape of the beam is a D-section cross-section having a top and bottom flat surface area. The remaining curved side of the beam is parabolic to fill a design window specified by the automobile manufacturer. Energy absorbing polypropylene foam is attached to the exterior face of the bumper beam.

Testing to be explained hereinafter, reveals that rectangularly shaped sections for bumper beams may not necessarily be the most efficient design. Although it is necessary for the beam to have a broad impact surface, which effectively indicates that the front section of the beam should be essentially flat, an important part of the design is behind the front face section. A bumper beam able to withstand impact will be one that is not easily damaged by localized buckling. The semi-circular section, or D-section, placed behind the front face section minimizes the amount of compression at the rear side of the beam because of the limited material at this location. The D-section configuration also limits damage toward the front of the bumper beam because the front lacks surface planes of material that can easily buckle. In addition, the D-section or semi-circular section maximizes the inertia to cross-sectional area ratio. Most importantly, the D-section bumper beam design was found to experience the barrier wall impact at 5 mph and successfully rebound without buckling.

Other objects, advantages and applications of the present invention will become apparent to those skilled in the art when the following description of the best mode contemplated for practicing the invention is read in conjunction with the accompanying drawings.

DESCRIPTION OF THE PREFERRED EMBODIMENT

Figure 1:
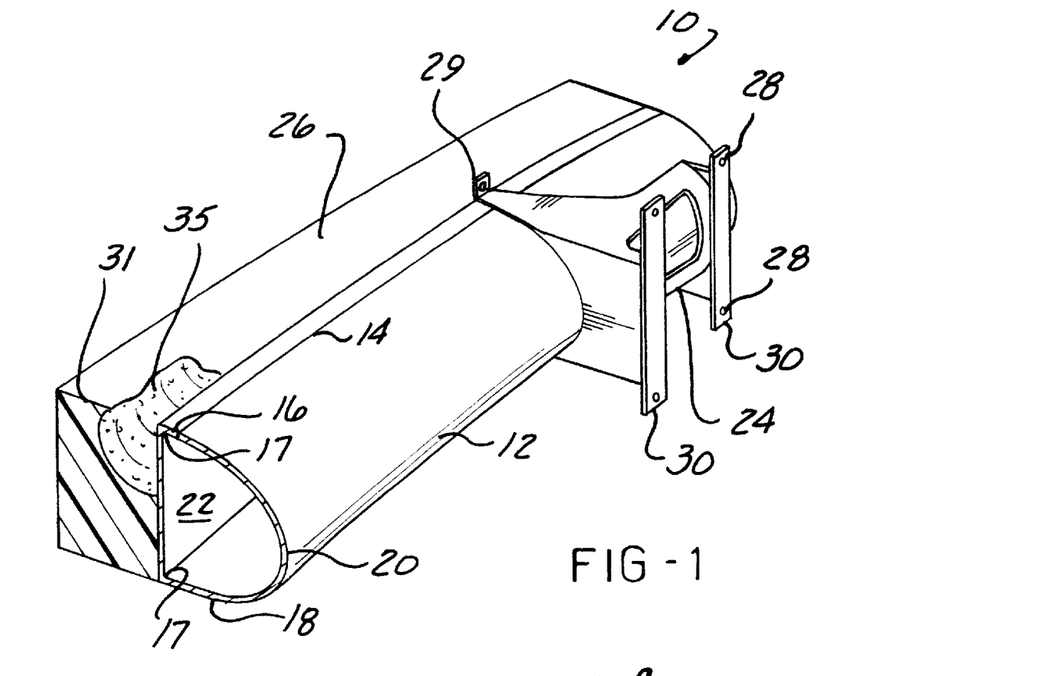
FIG. 1 is a perspective view of the preferred embodiment of a D-shaped bumper system cut along its neutral axis.
Figure 2:
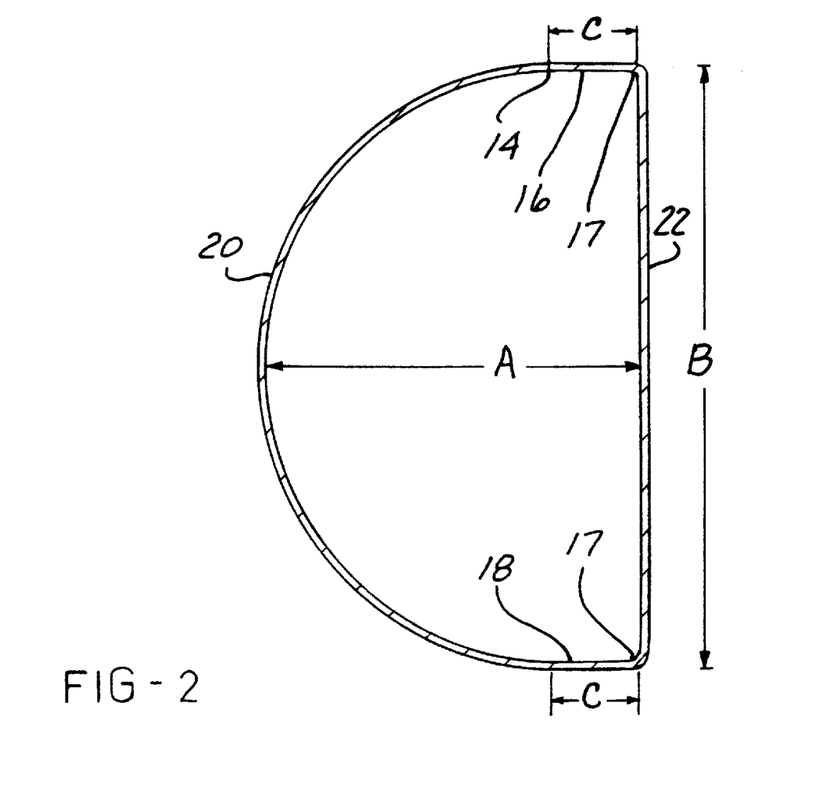
FIG. 2 is a cross-sectional view of the D-shaped bumper beam.

FIGS. 1 and 2 show the final and preferred embodiment of a D-shaped bumper system 10 cut along the neutral axis 31 to show its internal configuration. A complete D-shaped bumper system would also include the mirror image of that shown in FIG. 1. The preferred embodiment was determined as a result of intensive testing, as will be described hereinafter. The bumper system includes a bumper beam 12 formed from roll-formed steel in a tubular body having the generally D-shaped cross-section. The D-shaped cross-section has a top and bottom flat surface area (16 and 18 respectively) and a parabolic center area 20 therebetween. A generally planar wall 22 opposes the parabolic center area 20 to define the D-shape configuration. A weld 14 joins the ends of the tubular sheet along its longitudinal axis.

The final parameters of the bumper include the bumper beam 12 and mounting brackets 24 having a weight less than or equal to 20 pound to maintain current fuel economy levels. The mounting brackets 24 for attaching the bumper beam 12 to vehicles are, preferably, approximately 2 lbs.

each or less. The outside curvature of the bumper beam is set at a sweep of 45. Three inch thick foam 26 is attached and extends from the generally planar wall 22 of the bumper beam for energy management and absorption.

The bumper section is designed to allow the bumper beam to fill a box 80 mm deep (A) and 112 mm tall (B) (3.15 inches and 4.41 inches, respectively). The bumper beam has an inboard span of 20 inches to the center of bolt attachment holes 28 for the mounting bracket 24. The outer attachment 29 is located 3.3 inches beyond the bolt attachment holes 28 to the center of the attachment. As a result of these dimensions and those described hereinafter, the bumper beam 12 can withstand a 5 mph barrier impact and result in a rear beam deflection of less than 1 inches.

The study to determine the most effective bumper beam configuration was conducted by designing various bumper beams, all having the same length and sweep (#44) and using high-strength steel material having identical properties (200 KSI yield and 250 KSI tensile). The beams were provided with different cross-section configurations. To provide similar weights between the beams, the material thickness of a particular beam was increased or decreased appropriately. In addition, similar bracket designs were developed and attached to the beams at identical spans to keep any variability in testing to a minimum. Each beam was modeled using NISA II, an FEA package that conducted non-linear transient dynamic analysis. A force and time pattern was taken from prior 5 mph barrier impact testing and was supplied as the time amplitude curve defining the force the bumper would receive upon impact. The impact simulated that of a pendulum style, wherein the forces rose linerally from 0 to 25,000 lbs. in 0.036 seconds. Table I shows the results of the FEA tests indicating the beam crosssection, the thickness of the beam in inches, the strip width of the beam in inches and the inertia. The beam cross-section designs in Table I are displayed in order of highest to lowest strength performance.

TABLE I

| BEAM | THICKNESS (IN) | STRIP WIDTH (IN) | INERTIA (IN$^4$) |
| --- | --- | --- | --- |
| D-shaped section | 0.0675 | 12.495 | 1.303 |
| B-shaped section | 0.0433 | 19.478 | 1.277 |
| I-shaped section | 0.0572 | 14.742 | 1.421 |
| Rectangular section | 0.0597 | 14.136 | 1.584 |

Figure 3:
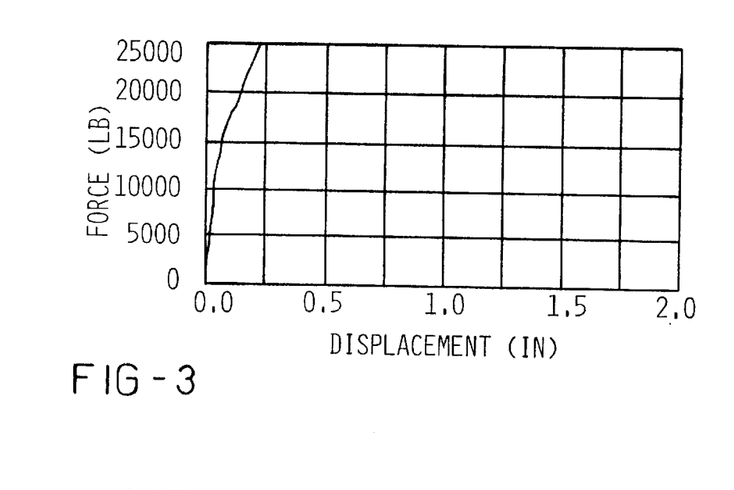
FIG. 3 is a graph of an impact test of a D-shaped beam section, force vs displacement.
Figure 4:
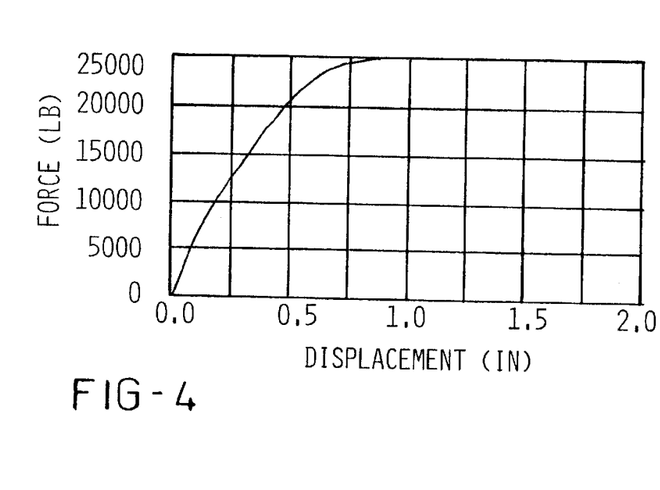
FIG. 4 is a graph of an impact test of a B-Shaped beam section, force vs displacement.
Figure 5:
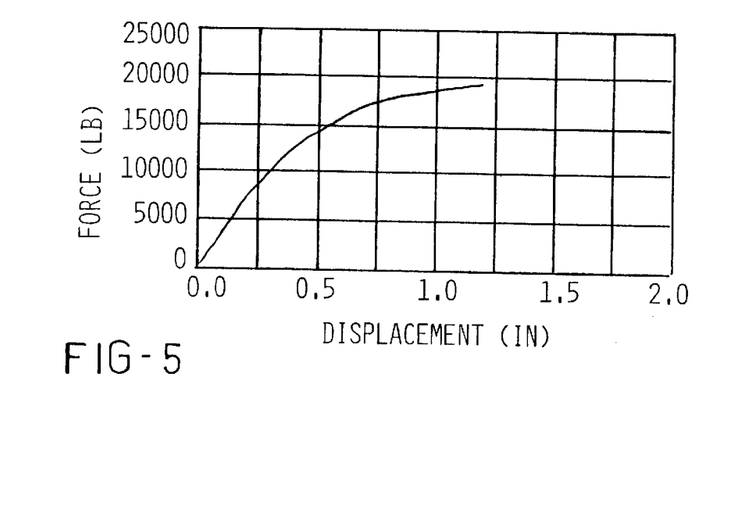
FIG. 5 is a graph of an impact test of an I-shaped beam section, force vs displacement.
Figure 6:
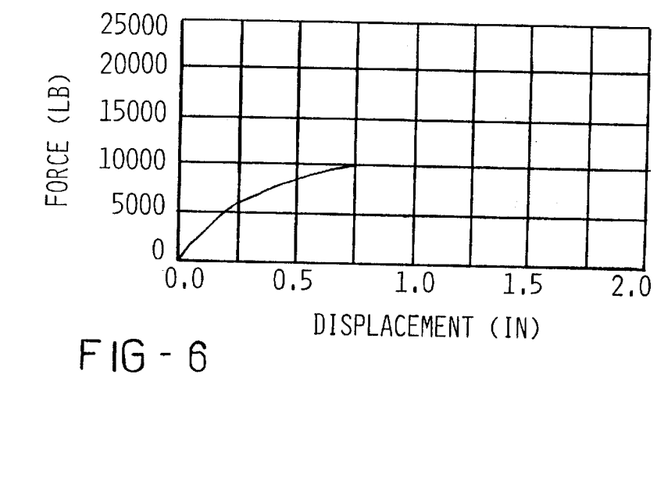
FIG. 6 is a graph of an impact test of a rectangular-shaped beam section, force vs displacement.

FIGS. 3–6 show the graphs of the various shaped beam sections listed in Table I indicating the pound force and the displacement of the beam in inches. As seen in FIG. 3, under the maximum load of 25,000 pound force, the beam deflection of the D-shaped beam was 0.25 inches. The D-shaped beam did not show signs of buckling. Buckling on the graph in FIG. 3 would have been indicated by a sharp or sudden slope decline in the force versus displacement line. When the beam buckles, it is likely that there may be some type of exterior body damage to the vehicle. This is due to the amount of deflection quickly increasing while the force of the beam either remains approximately the same or drops. The remaining 3 three beams tested, as shown in FIGS. 4–6, indicate the buckling phenomenon. The B-shaped beam in FIG. 4, begins to buckle at 0.5 inches displacement and 20,000 lbs. The I-shaped beams shown in FIG. 5, begins to buckle at 0.5 inches and at approximately 14,000 lbs. The rectangular beam shown in FIG. 6, buckles at approximately at 0.25 inches displacement and at 5,000 lbs. force.

Figure 8:
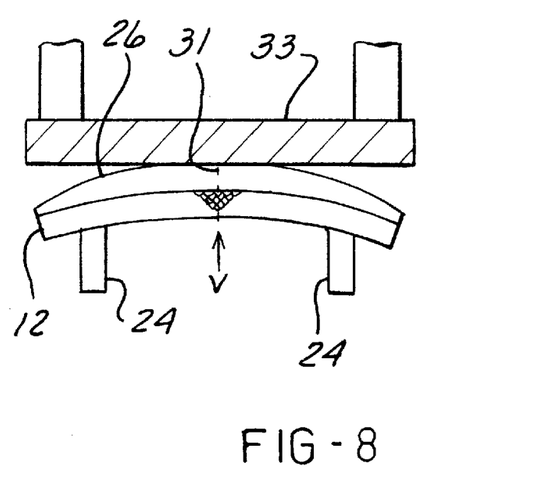
FIG. 8 is a schematic view of the bumper system contacting the barrier.
Figure 9:
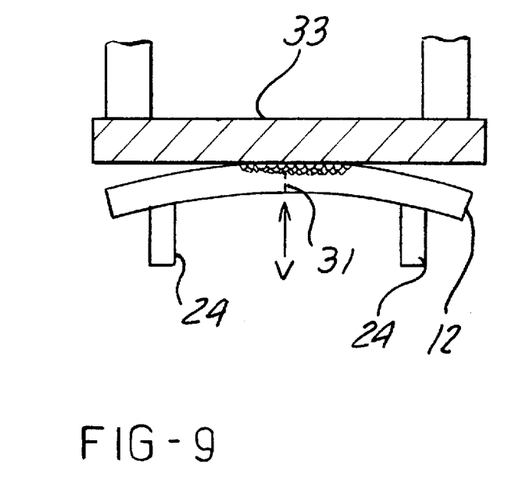
FIG. 9 is a schematic view of a bumper system without foam contacting the barrier.

There are three major components of a bumper system. The major components include an energy absorbing foam 26, a large sweep, high strength bumper beam 12, and supporting brackets 24. For an impact test set-up, the three components are attached to a test cart frame rail fixture as shown schematically in FIG. 7, that is designed to hold the bumper system 10 securely in place during impact. During the impact or barrier tests, the test cart ramps (designated as V) up to a constant velocity of 5 mph. The bumper system is initially contacted with the barrier 33 at the most exterior point, which is the energy absorbing foam 26. The foam 26 quickly compresses at the neutral axis 31 of the beam as seen in FIG. 8, so that the barrier force is distributed along the surface contact area. The distribution of barrier force grows as more foam 26 is compressed. The most highly compressed foam 26 is located at the neutral axis 31. FIG. 9 shows a schematic of an impact of a bumper 12 having no foam attached to the exterior. Without the additional of properly designed foam, increased damage to the bumper and vehicle may result.

The sweep number defines the curvature of the bumper beam 12 along its longitudinal axis. The higher the sweep number obtained, the smaller the radius of curvature for the bumper 12. A highly swept bumper in contact with a barrier wall 33 results in a large force being applied to a small contact area. As a result, localized denting resulting in premature buckling could occur. Bumper beams with absorbers placed on their surface decrease local denting on impact. One advantage of having a large sweep in the bumper beam 12 is to provide a space behind the central portion of the bumper beam 12 for the engine or other components, and to permit deflection of the bumper beam 12 in the event of impact without damaging structure behind the bumper beam 12. At the same time, a bumper beam 12 having a high sweep number reacts differently than those with a lower sweep number. Forces applied to the bumper beam 12 having a large or high sweep number, are concentrated at the nose of the beam due to its geometry. For the bumper beam 12 with a high sweep number, there results in a higher localized loading upon impact which is due to localized buckling and bending stress.

After determining that a D-shaped beam was the optimum configuration, another set of testing was conducted to fine tune the D-shape of the beam 12. In the second portion of the testing, a baseline D-section bumper, was designed for finite element testing in order to minimize the amount of computer processing time. The baseline bumper had a right angle corner 17 on the front of the beam 12. The material thickness of the bumper was set at 0.068 inches, which is typical for bumper beams. The shape of the D-section was defined as having a perfect radius of 2.17 inches to define the rear-section of the beam. The sweep of the baseline bumper was set at 45 and the span was set at 38.0 inches. Three inches thick foam 26 was applied to the front of the beam 12. The foam 26 was not cored. Brackets 24 were modeled to hold the bumper in place when impacted. Equal bracket dimensions were maintained to limit variability in the testing. Each bracket 24 was exactly 5 inches long in the wide direction, and having a material thickness of 0.1875 inches. The bracket 24 was 2.5 inches tall and 2.0 inches deep starting at the top of the bracket. The bracket 24 was vertically centered on the back of the beam.

Rigid links 30 were modeled to simulate weld locations between the bumper and the mounting brackets. Two pair of links 30 were placed on both and top of the mounting bracket 24, and were positioned approximately 1" toward the middle of the bracket from the inboard and outboard edges. Symmetry was utilized to save computer time for the analysis.

A barrier impact of 5 mph was chosen as a primary means for evaluating the structural worthiness of the bumper. "Part 581-Bumper Standard" of the United States National Highway Traffic and Safety Administration requires bumper impact procedures to be followed in a specific order. In the first instance, the front and rear vehicle bumpers are required to meet a 30° angled pendulum hit at 1.5 mph, followed by two frontal pendulum impacts at 2.5 mph. The bumper must then be attached to a freely rolling vehicle and impact a fixed barrier at 2.5 mph. The test vehicle and pendulum weights should be equated to the curved weight of the vehicle. Damage must be limited to dents no greater than 0.375 inches with an allowable, permanent set of 0.75 inch. There should not be any separation of surface material and no breakage or release of fasteners or joints. Although the Federal Government requires that a bumper be capable of withstanding 2.5 mph impacts without appreciable damage, most automotive companies strive to design bumpers to withstand 3 mph corner pendulum impacts and 5 mph longitudinal pendulum and barrier impacts.

Throughout the testing, symmetry was utilized to save costly computer time needed for analysis. The reactions experienced in barrier impact tests are symmetric about the centerline of the bumper. Symmetric constraints were applied to the centerline nodes of the bumper so that only half of a model would be needed. The constraints disallowed the y-displacement, x-rotation, and z-rotation degrees of freedom. The nodes at 28 on the ends of the mounting brackets were constrained in all six degrees of freedom.

LS-DYNA3D version 93, by Livermore Software Technology Corporation (LSTC), was the analysis software used. LS-DYNA3D is a crash analysis tool that solves highly non-linear models by using explicit time integration methods to control the time steps involved in solution. LS-DYNA3D's automatic surface contact with a soft option for the foam, was used to simulate all of the contacts that the bumper made with the mounting brackets and foam. A rigid stonewall, an infinitely stiff moving plane, was used to simulate the barrier wall 33. Unlike real barrier impacts, in this simulation, the barrier wall 33 impacts the bumper and not vice versa. The wall 33 was defined with a mass of 5,208 lb.s$^2$/in (2012.5 lbs), half of the 4,025 lb vehicle weight due to symmetry. The wall had an initial velocity of 88.0 in/s (5 mph) and its normal pointed in the positive x-direction.

One node, selected at the vertical midpoint of the rear side of the beam, was chosen to take nodal point displacements. With the DN101 baseline bumper, this node was chosen at the vertical center of the bottom leg on the rear side of the bumper.

Figure 10:
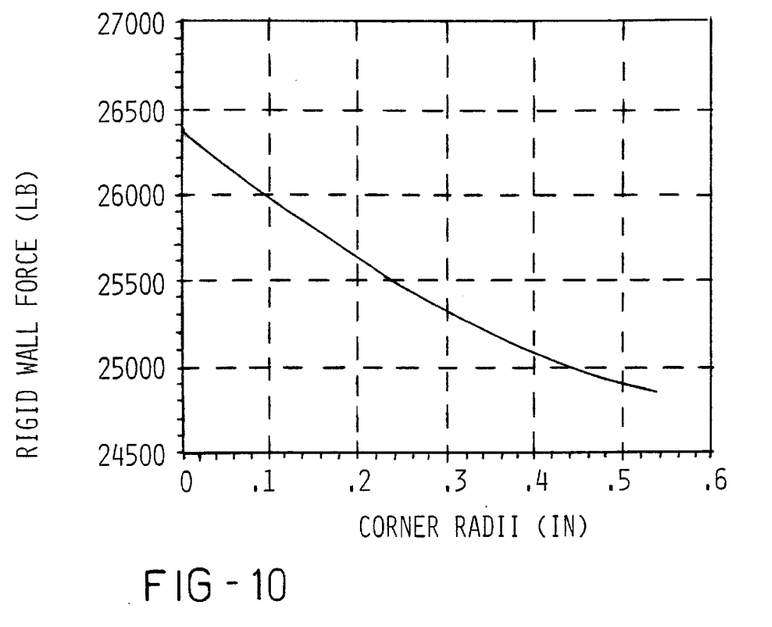
FIG. 10 is a graph showing the effects of corner radii on maximum rigid wall force.

The baseline D-section bumper was modified to determine other criteria that would maximize the strength of the base line D-section bumper. These and modifications included: changing the corner radii, the material thickness, the shape of the D-section, the sweep, the span, and the effects of foam coring. The first modification includes changing the radii of the front corners, as shown in FIG. 2 at 17, from a right angle to a curved corner. FIG. 10 shows the results of changing the corner radii 17 for maximum wall force. The smaller or tighter radii increased the inertia of the cross-section beam while adding minimal weight to the bumper beam 12. When the D-section corner radii 17 was at a right angle, rigid wall force reached a maximum of over 26,300 lbs., wherein when the corner radii was greater than 0.5 inches the rigid wall force fell below 25,000 lbs.

Figure 11:
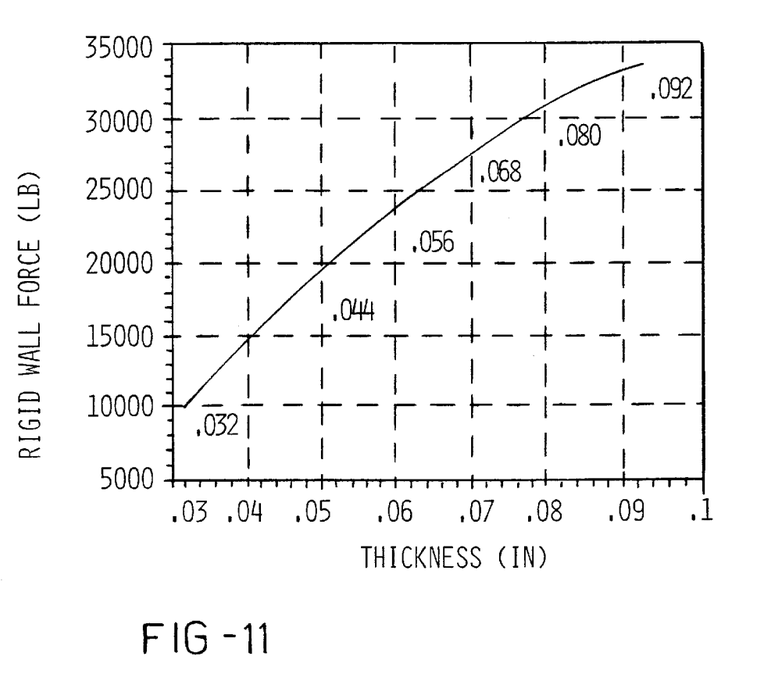
FIG. 11 is a graph showing the effects of material thickness on maximum rigid wall force.
Figure 12:
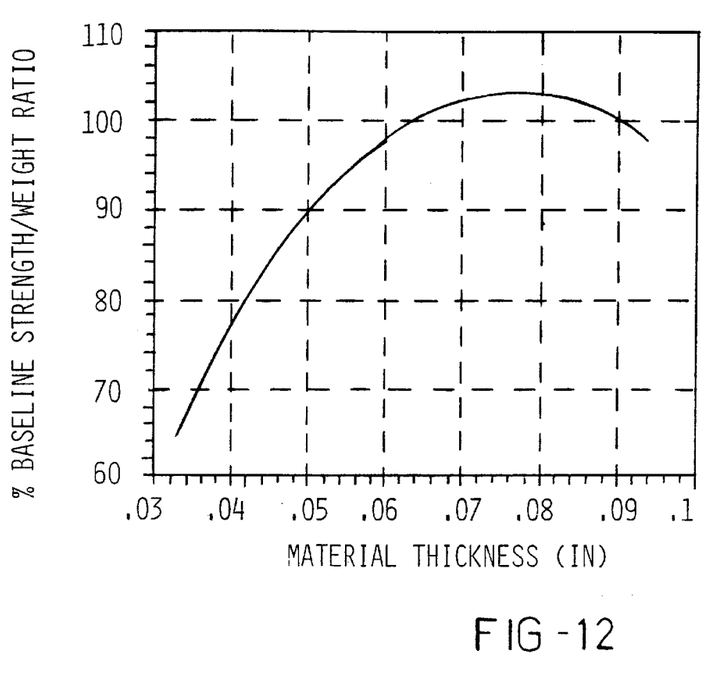
FIG. 12 is graph showing the effects of material thickness on the strength to weight ratio.

When the thickness of the bumper beam was increased, the weight of the beam increased proportionally. Although, the material weight increased proportionally with the thickness of the beam, the beam strength versus the thickness of the beam followed a slightly negative parabolic curve. As seen in FIG. 11, increasing the material thickness for an extremely thin bumper will greatly improve the bumper strength, but as the thickness of the beam 12 increases, the effects of adding more material does not substantially add strength to the beam 12. FIG. 12 shows the strength to weight ratio improvement by adding material thickness. The strength to weight ratio of the bumper increased quickly from the extremely thin (0.032 inch) material, until it reached a maximum at 0.076 inch thickness. The strength to weight ratio decreased after the maximum of 0.076 inch thickness. After this point, the performance gain is minimal with weight increase.

Figure 13:
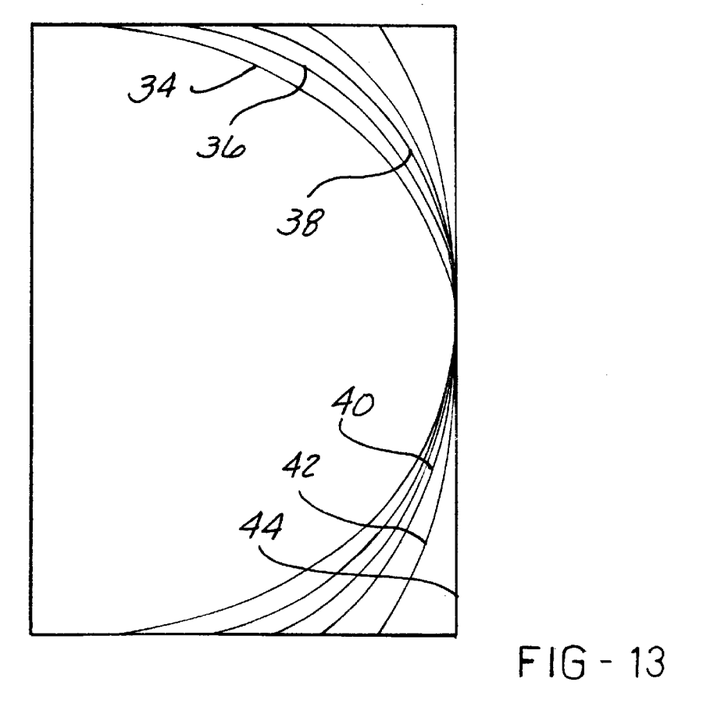
FIG. 13 is graph showing D-section shapes developed for testing.

The curvature of the backside of the beam defining the D-section was tested by varying the curvature of the backside to ensure a properly optimized shape. The shape was consistently changed by the equation that defines the parabola of the surface. FIG. 13 shows a scale drawing of each of the sections defining the curvature. Line 34 relates to the curve defined by the equation Y=0.468(x)$^2$, line 36 defines a circle having a 2.17 inch radius. Line 38 defines the equation Y=0.337(x)$^2$. Line 40 defines the equation Y=0.220 (x)$^2$. Line 42 defines the equation Y=0.102(x)$^2$. Line 44 defines the equation Y=0, which is a straight line.

Figure 14:
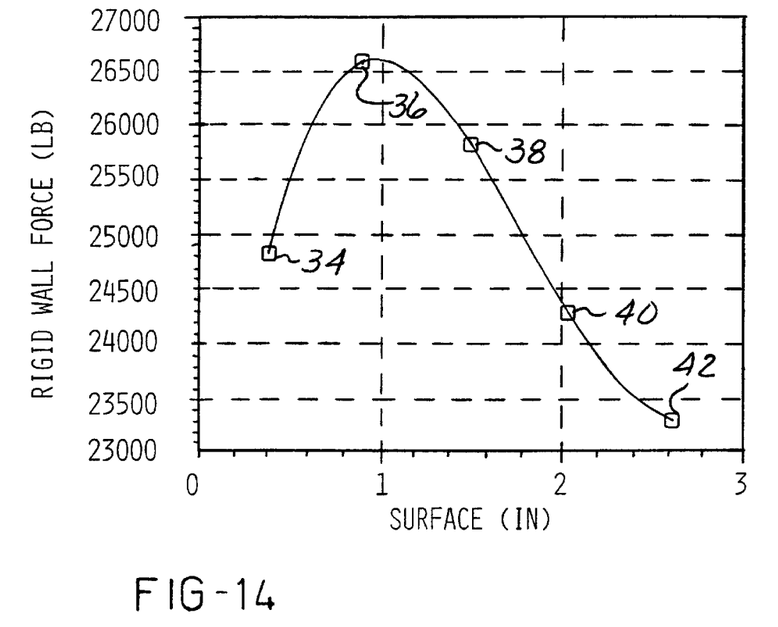
FIG. 14 is a graph showing the effects of shape on rigid wall force.

FIG. 14 is a graph which displays the results of FEA testing that signifies the performance variation of the D-section shapes using the equations defining the curves in FIG. 13. The numbers in FIG. 14 correspond to the equation line numbers of FIG. 13. Line 44 represents the rectangular beam configuration, which was tested in the first portion of the analysis. When the curvature is at its greatest, as shown at 34, the rigid wall force of the beam is not as high as a curvature having a certain amount of flat surface on the top 16 and bottom 18 of the beam 12. In FIG. 14, the amount of flat surface portions at the top and bottom is shown to be most effective for improved strength at 1.0 inches. After the beam surface is extended beyond this point, the beam loses strength as it begins to resemble a rectangular section. Further testing revealed that the maximum weight to strength ratio occurs when the top and bottom flat surface portions 16 and 18 respectively are 0.88 inches rather than 1.0 inch. The flat surface portions have a length of 0.88 inches as designated as C in FIG. 2.

Figure 15:
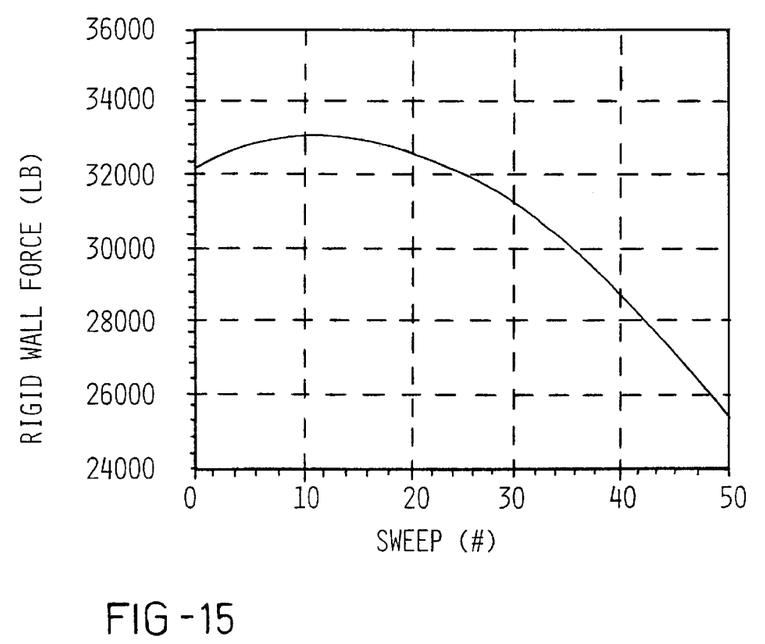
FIG. 15 is a graph showing the effects of sweep on rigid wall force.

The effects of the sweep of the D-shaped bumper was evaluated to determine its effect on strength of the beam 12. FIG. 15 shows that there is general decline in maximum beam performance as the sweep increases from a sweep #11 to a #50. It has been found that the increase in sweep has a more dramatic effect on the strength of the beam than the other test variables. The graph shows that the maximized strength is approximately located at sweep #11.

Sweep has a dramatic effect on the amount of bending stress the bumper experiences. This is due to the amount of surface contact that the bumper receives. If a bumper beam has a small sweep, the bumper receives much more of its wall force distributed over the beam surface. This wide distribution of force provides for less concentration at the neutral axis and lower moments about the frame brackets. Although the higher sweep number provide a stress disadvantage to the bumper beam, the higher sweep numbers are necessary for styling of the bumper to the vehicle and providing space for other components behind the bumper assembly. Therefore, a compromise is necessary to increase the sweep number for styling without foregoing too much beam strength.

Figure 7:
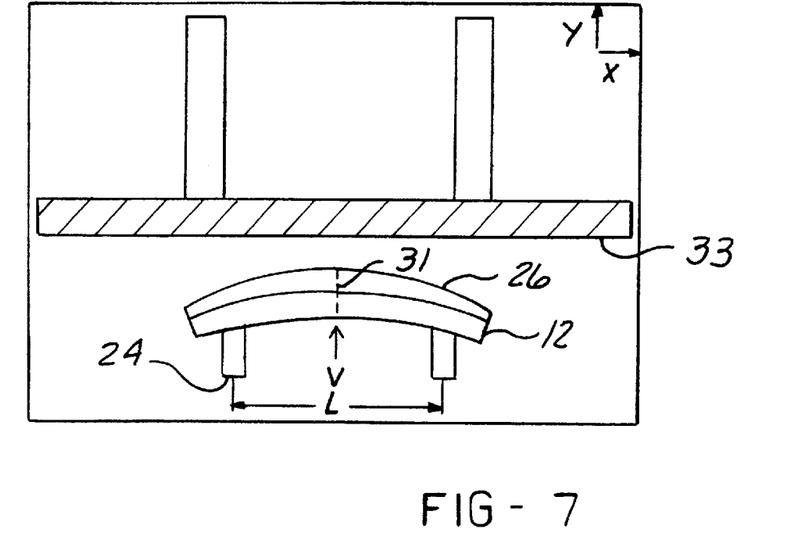
FIG. 7 is a schematic view of a bumper system and an impact barrier.

The span is defined as the spacing between the inboard brackets 24 as signified as (L) in FIG. 7. The span and the longitudinal axis has an effect on the strength of the bumper. Classical theory implies that as the span between beam supports decrease, the resulting maximum load increases. This results because the moment arm between the inboard bracket and the longitudinal axis is shortened which decrease the amount of deflection.

Figure 16:
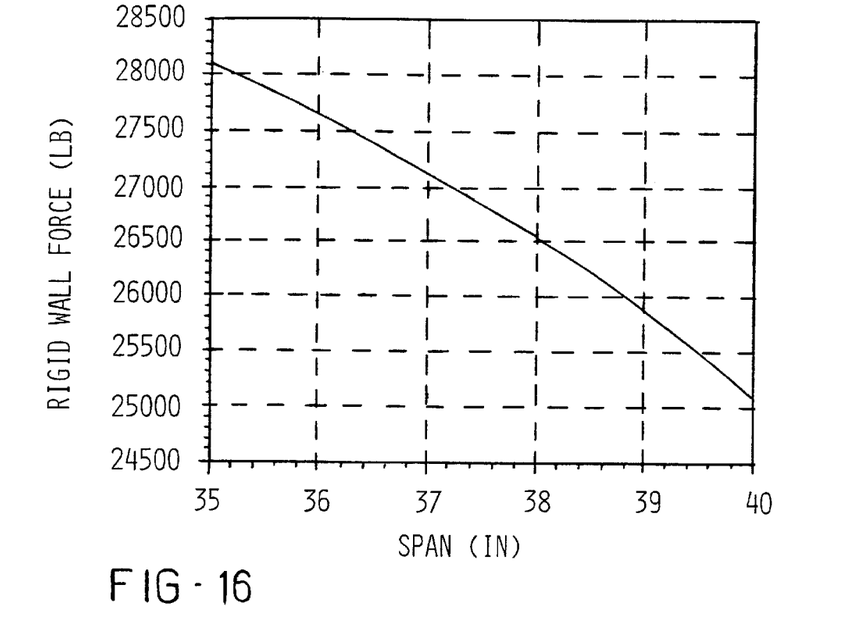
FIG. 16 is a graph showing the effects of span on rigid wall force.
Figure 17:
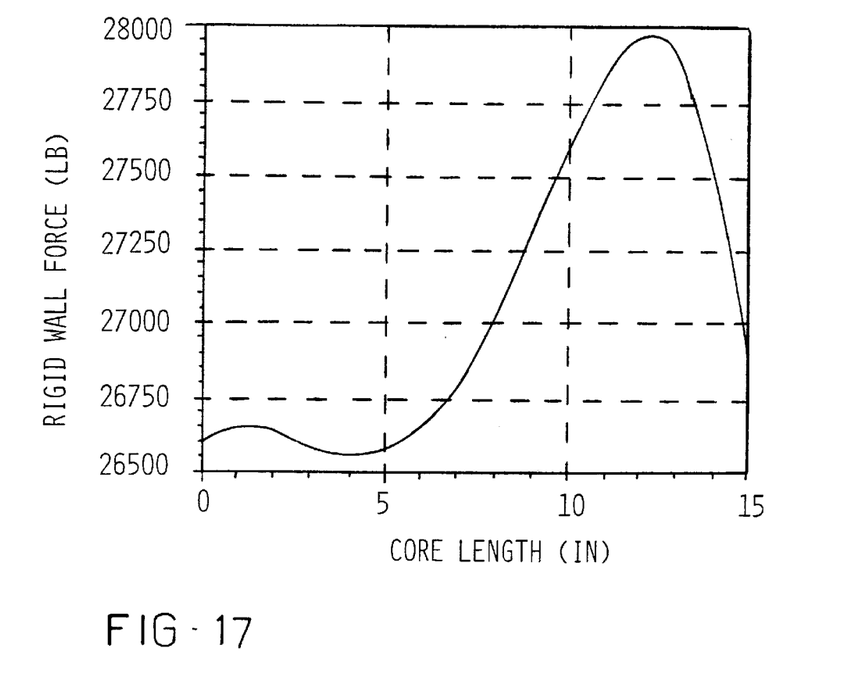
FIG. 17 is a graph showing the effects of foam coring on rigid wall force.

Five beams and the baseline bumper were tested by varying the location of the bracket along the beam. The effective spans evaluated were from 35.0 to 40.0 inches, with 38.0 inch span being the baseline span. Testing showed that there is a slightly negative parabolic increase in strength as the span decrease from 40.0 to 35.0 inches, as seen in FIG. 16.

Another criteria that effects rigid wall force is foam coring. Form coring is performed by removing material from the energy absorber at strategic locations to improve impact performance. The foam coring is signified at 35 in FIG. 1. A small amount of foam is usually removed on the backside of the absorber 26 near the bumper face. A baseline beam in the study had no foam coring. Five additional bumpers were tested by removing a section 1.0 inch deep by 2.17 inches tall by increments of 3.0 inches, for a maximum coring of 15.0 inches. Foam coring had a dramatic increase to the impact strength of the bumper. By removing approximately 0.07 lbs. of material at 11.0 inches of coring length, there is a maximized effect on the beam performance.

As a result of the aforementioned testing, a bumper beam assembly having the optimum strength and compliance with necessary styling considerations included the following criteria: A D-shaped configuration having a generally planar wall 22 and a semi-circular wall 20 opposing the planar wall. The semi-circular wall 20 having a top and bottom flat portion 16 and 18 respectively, with a length of approximately 0.88 inches each. The center portion of the semi-circular wall is defined by a circle having a radius of 2.71 inches. The corners 17, where the top 16 and bottom 18 flat portions meet the planar wall to form a 90° angle. The thickness of the beam material is preferably 0.076 inch. The sweep is approximately 45 or styling considerations. The span (L) between brackets is preferably 35 inches; and the amount of foam coring is preferably set at removing 0.07 lbs. of material at 11.0 inches for maximum impact strength of the bumper.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A bumper system for a vehicle comprising:
   a single beam member constructed of metallic material having a substantially D-shaped cross-section including a planar wall and a substantially semi-circular wall joined to define a unitary hollow interior, wherein the substantially semi-circular wall faces the vehicle.

2. The bumper system of claim 1, wherein the semi-circular wall terminates at a top flat surface area and at a bottom flat surface area each adjacent to the planar wall.

3. The bumper system of claim 2, wherein the substantially semi-circular wall has a parabolic shaped center portion.

4. The bumper system of claim 1, wherein the beam member is swept.

5. The bumper system of claim 4, wherein the metallic material of the bumper beam has a tensile strength exceeding 100 KSI.

6. The bumper system of claim 1 wherein the beam member is formed from rolled sheet steel into a tubular body having the D-shaped cross-section.

7. The bumper system of claim 2 wherein the top flat and bottom flat surface areas each measure less than one inch in length.

8. The bumper system of claim 1 further comprising a single rectangular longitudinal piece of foam attached to the planar wall.

9. The bumper system of claim 8, wherein the planar wall has an interior surface facing the semi-circular wall and an opposing exterior surface and said longitudinal rectangular piece of foam is attached to the exterior surface and measures approximately three inches thick.

* * * * *